June 9, 1953   W. F. LOWE   2,641,155
NETMAKING AND GAUGING TOOL
Filed Jan. 2, 1952
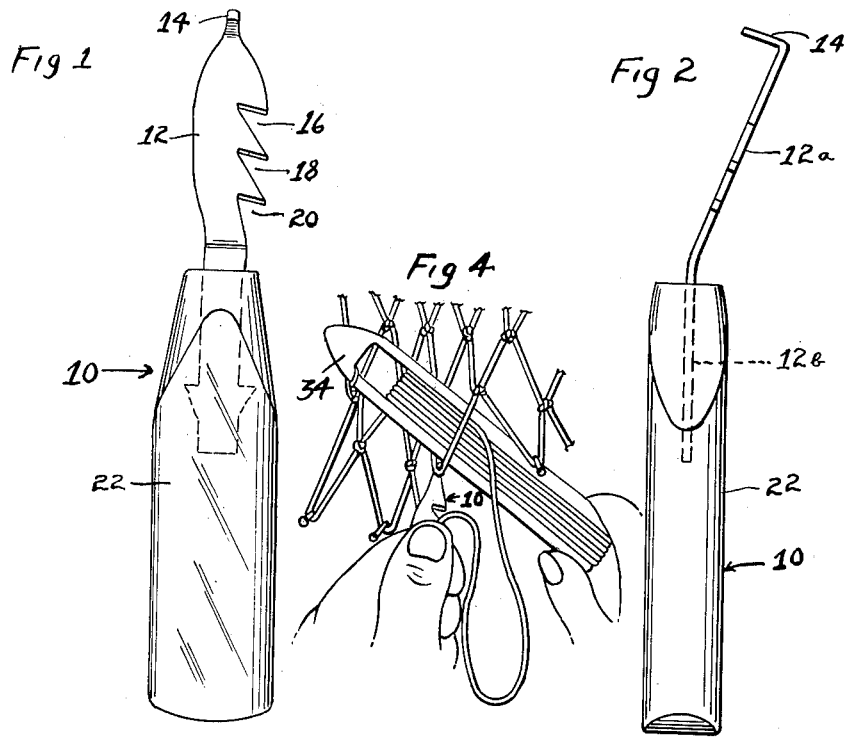
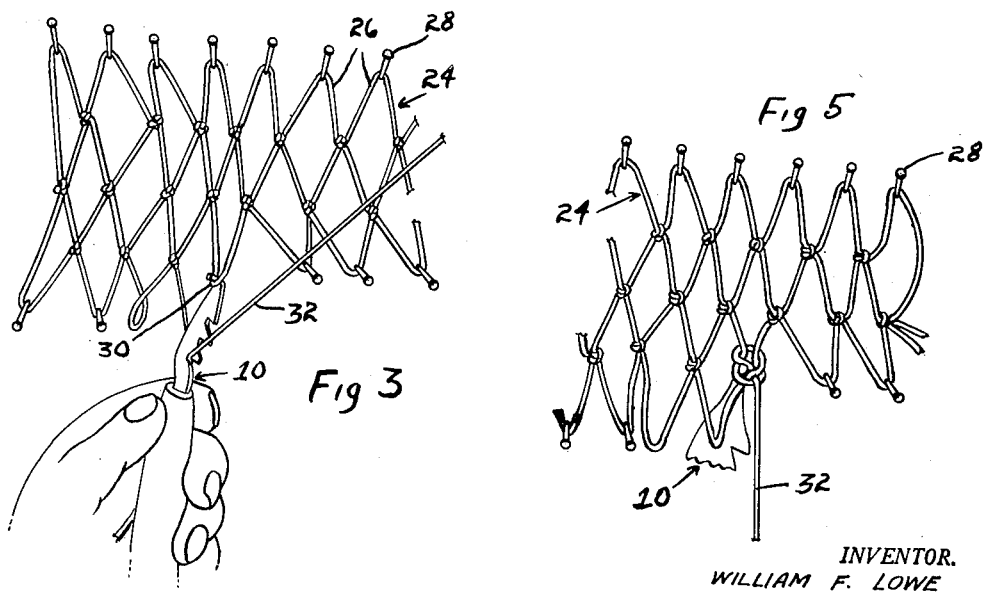
INVENTOR.
WILLIAM F. LOWE
BY
Samuel J. Stoll
ATTORNEY Patented June 9, 1953

2,641,155

UNITED STATES PATENT OFFICE 2,641,155

NETMAKING AND GAUGING TOOL

William F. Lowe, Beechhurst, N. Y.

Application January 2, 1952, Serial No. 264,388

7 Claims. (Cl. 87—54)

This invention relates to a tool for making and gauging nets. Although it applies particularly to fishing nets, it is also applicable to other types of nets and netting. Illustrative are tennis nets and basketball nets.

The principal object of this invention is the provision of a combination net making and gauging tool which renders it possible to make and gauge the net at the same time. This tool comprises a cord holding finger, at least one cord receiving and gauging notch, a shank in which said notch is formed and on which said finger is formed, and a handle which supports said shank. When the tool is used for the purpose for which it is designed, its finger is caused to engage one of the bights which were previously fashioned, and the shuttle cord is then looped through the notch and then through said bight and between said finger and said bight. The cord is thereby held by the finger preparatory to the knot tying operation and the finger is slipped out of the bight and out of engagement with the cord only after the knot is formed.

The distance between the finger of the tool and its notch determines the size of the net openings. The greater the distance between the finger and the notch, the larger the openings. In the preferred form of this invention, there are three spaced notches, each a different distance from the finger. Hence the mesh openings may be made larger or smaller depending upon which of the three notches is used during the course of the net making operation.

It is accordingly another object of this invention to provide a net making and gauging tool, which, without being adjustable in any of its parts, is nonetheless suitable for making nets having openings of different sizes. The net making and gauging tool herein described and claimed is a one-piece affair in that its finger and notches are all formed on and in the same shank. The shank may be elongated to serve as a handle so that the entire tool would comprise but a single piece of metal stamped or otherwise formed in accordance with the present design. The handle may, however, be a separate member made of suitable material such as plastics, to render the tool somewhat more comfortable to the hand. The tool proper may be made of any suitable metal, such as brass or stainless steel.

A preferred embodiment of this invention is shown in the accompanying drawing in which:

Fig. 1 is a face view of a combination net making and gauging tool made in accordance with this invention.

Fig. 2 is a side view thereof.

Fig. 3 is a perspective view showing how the tool is used in the making of a net, the finger of the tool being shown in engagement with a previously made bight and the shuttle cord being shown in engagement with one of the gauging notches of the tool.

Fig. 4 is another perspective view showing a subsequent step in the making of the net, wherein the cord is manually held in engagement with the notch and the shuttle is drawn through the bight which was previously made.

Fig. 5 is still another perspective view which shows the shuttle cord held in place against the bight by the finger, preparatory to the knot tying operation.

The net making and gauging tool 10 shown in the drawing, comprises a shank 12, a finger 14 formed at the top end of the shank, a series of notches 16, 18 and 20 formed in one side of the shank and a handle 22 secured to the lower end of the shank. Finger 14 and shank 12 are both made of the same piece of sheet metal and the notches are, of course, formed in the very same piece of metal. In the preferred form of this invention, the shank and its finger and notches are all stamped out of a single sheet of metal or out of a single metal strip. Since the principal use of this tool is in connection with fishing nets and since it is most likely to be exposed to water, especially sea water, and also to sea air, it is highly desirable that it be made of rust and corrosion resistant metal. Nickel or chromium plated brass is a very suitable material for this purpose. So also is stainless steel. The handle may be made of wood, plastics, cork and the like. If it is made of cork, its buoyancy should be sufficient to prevent the tool as a whole from sinking in water. As has above been indicated, handle 22 is provided solely for the purpose of comfort in handling and using the tool and it may be dispensed with, if desired, by simply elongating the shank and shaping its lower end to serve as a handle.

It will be noted in Fig. 2 that the shank has an upper portion 12a and a lower portion 12b. The lower portion 12b is set into the handle and it is axially aligned therewith. The upper portion 12a is bent approximately twenty-five degrees out of alignment with the lower portion 12b. Finger 14 is bent at right angles to the upper shank portion 12a and it projects forwardly in the direction of the longitudinal axis of the handle.

Figs. 3, 4 and 5 show a net or netting 24 in process of being made. Its upper loops 26 are supported on a board by means of nails or pins 28 and it is extended downwardly and sidewardly by means of the tool herein claimed in the manner shown in the drawing. Referring now to a single loop forming and knot tying operation, it will be seen that the tool is held in the hand in the manner illustrated in Fig. 3. Finger 14 is brought into engagement with a bight or loop 30 and the tool is then pulled downwardly to keep the cord taut. The shuttle cord 32 is then drawn downwardly from the net into engagement with one of the three notches 16, 18, 20 and it is then drawn upwardly in the manner shown in Fig. 3.

In the next step, the thumb of the person using the tool is placed upon the shuttle cord 32 at the point where it leaves the notch and the shuttle cord is held there to prevent loosening. In the following step, the shutle 34 is brought through the loop which finger 14 engages, as Fig. 4 clearly shows. The shuttle cord is then pulled downwardly until it is gripped between finger 14 and bight 30, and it is now possible to release the thumb from the shuttle cord without loosening said cord. In the succeeding step of the process, a knot is tied around the loop which finger 14 engages, immediately above said finger (Fig. 5). When the knot is tied, finger 14 may be withdrawn from bight 30 and the new loop is thereby completed.

The foregoing is illustrative of a preferred form of this invention. It will clearly be understood that this preferred form may be modified and other forms may be provided within the broad scope of this invention and the broad spirit of the claims.

I claim:

1. A net making and gauging tool, comprising a shank having a lower portion and an upper portion which is bent at an angle to the lower portion, a handle secured to the lower shank portion in alignment therewith, a loop-engaging finger formed at the top end of the upper shank portion and projecting forwardly therefrom at right angles thereto, and one side of said shank having notches therein.

2. A net making and gauging tool in accordance with claim 1, wherein the upper and lower shank portions and the loop-engaging finger constitute a single stamping.

3. A net making and gauging tool in accordance with claim 1, wherein the upper and lower shank portions and the loop engaging finger constitute a single stamping made of rust-resisting metal, and wherein the handle is made of plastics, the lower shank portion being set into said handle in axial alignment therewith.

4. A net making and gauging tool in accordance with claim 1, wherein the shank has three spaced notches therein, one below the other.

5. A net making and gauging tool in accordance with claim 1, wherein the handle is made of material which is sufficiently buoyant to float the tool in water.

6. A net making and gauging tool in accordance with claim 1, wherein the loop-engaging finger projects at an angle of no more than 90° with respect to the upper shank portion.

7. A net making and gauging tool in accordance with claim 1, wherein the loop-engaging finger projects at an angle of less than 90° with respect to the upper shank portion.

WILLIAM F. LOWE.

References Cited in the file of this patent

UNITED STATES PATENTS

| Number | Name | Date |
| --- | --- | --- |
| 262,140 | Sollers | Aug. 1, 1882 |
| 442,787 | Sollers | Dec. 16, 1890 |
| 1,376,151 | Mitchell | Apr. 26, 1921 |
| 1,769,953 | Holland | July 8, 1930 |

FOREIGN PATENTS

| Number | Country | Date |
| --- | --- | --- |
| 3,632 | Great Britain | of 1877 |
| 3,813 | Great Britain | of 1908 |